(12) United States Patent
Li et al.

(10) Patent No.: US 7,561,379 B2
(45) Date of Patent: Jul. 14, 2009

(54) LAMINATED RETURN POLE FOR SUPPRESSING SIDE TRACK ERASURE

(75) Inventors: Shaoping Li, Naperville, IL (US); Lei Wang, Apple Valley, MN (US); Chunhong Hou, Savage, MN (US); Song S. Xue, Edina, MN (US); Daniel John Brown, Woodbury, MN (US)

(73) Assignee: Seagate Technology LLC, Scotts Valley, CA (US)

( * ) Notice: Subject to any disclaimer, the term of this patent is extended or adjusted under 35 U.S.C. 154(b) by 496 days.

(21) Appl. No.: 11/262,198

(22) Filed: Oct. 28, 2005

(65) Prior Publication Data

US 2007/0097546 A1 May 3, 2007

(51) Int. Cl.
*G11B 5/127* (2006.01)
(52) U.S. Cl. .................................. 360/125.24
(58) Field of Classification Search ................. 360/126, 360/127, 125, 122, 125.12, 125.26, 125.06, 360/125.08, 125.24, 125.03, 125.21; 29/603.13, 29/603.01, 603.15, 603.14
See application file for complete search history.

(56) References Cited

U.S. PATENT DOCUMENTS

| | | | |
|---|---|---|---|
| 5,108,837 A | 4/1992 | Mallary | |
| 5,132,859 A | 7/1992 | Andricacos et al. | |
| 5,157,570 A | 10/1992 | Shukovsky et al. | |
| 5,196,976 A | 3/1993 | Lazzari | |
| 5,388,019 A | 2/1995 | Argyle et al. | |
| 5,621,592 A | 4/1997 | Gill et al. | |
| 5,792,547 A | 8/1998 | Liu et al. | |
| 5,864,450 A | 1/1999 | Chen et al. | |
| 5,966,800 A | 10/1999 | Huai et al. | |
| 6,009,060 A * | 12/1999 | Kim | 720/603 |
| 6,072,671 A | 6/2000 | Gill | |
| 6,122,144 A | 9/2000 | Chang et al. | |
| 6,163,442 A | 12/2000 | Gill et al. | |
| 6,233,116 B1 | 5/2001 | Chen et al. | |
| 6,282,056 B1 | 8/2001 | Feng et al. | |
| 6,292,334 B1 | 9/2001 | Koike et al. | |
| 6,393,692 B1 | 5/2002 | Ju et al. | |
| 6,501,619 B1 | 12/2002 | Sherrer et al. | |
| 6,510,030 B1 | 1/2003 | Song et al. | |

(Continued)

FOREIGN PATENT DOCUMENTS

EP      0301823 A2      2/1989

(Continued)

OTHER PUBLICATIONS

IEEE Transactions on Magnetics, vol. 38, No. 5 Sep. 2002, "Finite-Element Analysis of Ring and Single-Pole Write Heads for Perpendicular Recording", Wang et al.

(Continued)

*Primary Examiner*—Allen T Cao
(74) *Attorney, Agent, or Firm*—Kinney & Lange, P.A.

(57) ABSTRACT

A perpendicular writer includes a surface, a main pole proximate the surface, a return pole proximate the surface, and a back yoke connecting the main pole to the return pole distal the surface. The return pole is configured such that a magnetization of a portion of the return pole adjacent the surface is held substantially parallel to the surface during a write operation.

20 Claims, 4 Drawing Sheets

U.S. PATENT DOCUMENTS

| | | |
|---|---|---|
| 6,628,478 B2 | 9/2003 | Gill |
| 6,771,464 B2 * | 8/2004 | Minor .................... 360/125.12 |
| 6,775,099 B2 | 8/2004 | Kuroda et al. |
| 6,785,897 B2 * | 8/2004 | Takizawa et al. ............ 720/601 |
| 6,791,796 B2 | 9/2004 | Shukh et al. |
| 6,798,615 B1 | 9/2004 | Litvinov et al. |
| 6,813,115 B2 | 11/2004 | Van der Heijden et al. |
| 6,815,852 B2 * | 11/2004 | Horng et al. .............. 310/67 R |
| 2002/0071208 A1 | 6/2002 | Batra et al. |
| 2002/0131203 A1 | 9/2002 | Litvinov et al. |
| 2002/0176214 A1 | 11/2002 | Shukh et al. |
| 2003/0026039 A1 | 2/2003 | Okada et al. |
| 2003/0076627 A1 | 4/2003 | Minor et al. |
| 2003/0076629 A1 * | 4/2003 | Minor ........................ 360/126 |
| 2003/0197976 A1 | 10/2003 | Van der Heijden et al. |
| 2003/0227714 A1 | 12/2003 | Parker et al. |
| 2004/0252415 A1 * | 12/2004 | Shukh et al. ................. 360/317 |
| 2005/0068670 A1 * | 3/2005 | Amin et al. .................. 360/125 |
| 2005/0151825 A1 * | 7/2005 | Sukigara et al. ............. 347/225 |
| 2006/0044680 A1 * | 3/2006 | Liu et al. .................... 360/126 |
| 2006/0232882 A1 * | 10/2006 | Lee et al. .................... 360/126 |
| 2007/0003792 A1 * | 1/2007 | Covington et al. .......... 428/812 |

FOREIGN PATENT DOCUMENTS

JP          11167766 A  *  6/1999

OTHER PUBLICATIONS

Kittel, C. Introduction to Solid State Physics, 7th Edition; John Wiley & Sons, Inc., New York, 1996, pp. 628-629.

* cited by examiner

LAMINATED RETURN POLE FOR SUPPRESSING SIDE TRACK ERASURE

BACKGROUND OF THE INVENTION

The present invention relates generally to the field of electronic data storage and retrieval, and more particularly to a perpendicular magnetic writer having a return pole that is laminated to suppress side track erasure.

In an electronic data storage and retrieval system, a transducing head typically includes a writer for storing magnetically-encoded information on a magnetic medium and a reader for retrieving that magnetically-encoded information from the magnetic medium. The reader typically includes two shields and a magnetoresistive (MR) sensor positioned between the shields. Magnetic flux from the surface of the magnetic medium causes rotation of the magnetization vector of a sensing layer of the MR sensor, which in turn causes a change in electrical resistivity of the MR sensor. This change in resistivity of the MR sensor can be detected by passing a current through the MR sensor. External circuitry then converts the voltage information into an appropriate format and manipulates that information as necessary.

For a perpendicular recording head, the writer typically includes a main pole and a return pole which are connected to each other at a back end by a back yoke (or back via), and which are separated from each other at a surface of the writer opposite the back end by a gap layer. One or more layers of conductive coils are positioned between the main and return poles and are encapsulated by insulating layers. Often, the writer and the reader are arranged in a merged configuration in which a shared pole serves as both the top shield of the reader and the return pole of the writer. Alternately, the writer and reader may be arranged in a piggy back configuration in which top shield of the reader and the return pole of the writer are separated by a layer of a nonmagnetic material.

A perpendicular recording medium for use with a perpendicular recording head includes a storage layer and soft underlayer. The storage layer of the medium preferably has a high coercivity and perpendicular anisotropy; that is, its magnetization is preferably held in a direction substantially normal to a surface of the medium. The soft magnetic underlayer of the medium preferably has a high permeability and a substantially in-plane orientation of the easy axis.

To write data to the perpendicular magnetic medium, an electric current is caused to flow through the conductive coils to induce a magnetic field across the write gap between the main and return poles. In operation, the underlayer of the magnetic medium acts as a third pole of the writer such that the magnetic field bridges two gaps—the gap between the main pole and the underlayer and the gap between the underlayer and the return pole—with the magnetic field passing twice through the storage layer of the magnetic media. As connoted by their names, the main pole is used to physically write data to the magnetic medium, while the return pole provides only a return path for the magnetic field generated by the main pole. Thus, the magnetic field traversing the gap between the main pole and the underlayer is preferably strong enough to cause a bit to be recorded to the media while the magnetic field traversing the gap between the underlayer and the return pole is not.

To ensure that the magnetic field traversing the gap between the underlayer of the medium and the return pole does not contribute to the data written to the magnetic medium, the return pole conventionally has been formed of a lower magnetic moment material than the main pole and has been configured with a larger area at the media facing surface than the main pole.

Despite this larger surface area, the strength of the magnetic field affecting the magnetic medium under the return pole is nonetheless sufficient to overcome a nucleation field of magnetic medium. This results because the magnetic flux throughout the cross-section of the return pole is not uniform, but is instead concentrated along the edges of each element of the writer. This concentration along the edges is caused by various factors, including surface anisotropy, an edge pinning effect, and a skin effect. Further, this concentration of magnetic flux at the edges of the return pole may result in a sizable magnetic field being produced at the edges of the return pole when the write current is on. In fact, the magnetic field may be as great as 10-80% of the saturation magnetic flux density ($B_s$) of the return pole's soft materials. Further, this magnetic field may be large enough to cause undesired side track erasure on the magnetic medium. To the extent that the field is not strong enough to actually erase the magnetic medium below the return pole, the side-writing may be significant enough to accelerate the magnetization decay process, leading to a non-negligible threat to the long term data retention of the magnetic medium

BRIEF SUMMARY OF THE INVENTION

A perpendicular writer includes a surface, a main pole proximate the surface, a return pole proximate the surface, and a back yoke connecting the main pole to the return pole distal the surface. The return pole is configured such that a magnetization of a portion of the return pole adjacent the surface is held substantially parallel to the surface during a write operation.

DETAILED DESCRIPTION

The present invention is a perpendicular writer that suppresses the concentration of magnetic flux at the edges of a return pole of the writer adjacent a surface of the writer opposite a back via of the writer. To accomplish this goal, the writer is configured to cause the magnetization of the return pole adjacent the surface to be oriented in a direction substantially parallel to the surface during a write operation. Preferably, the magnetization direction is less than a 4° departure from parallel, and more preferably, less than a 2° departure.

Figure 1:
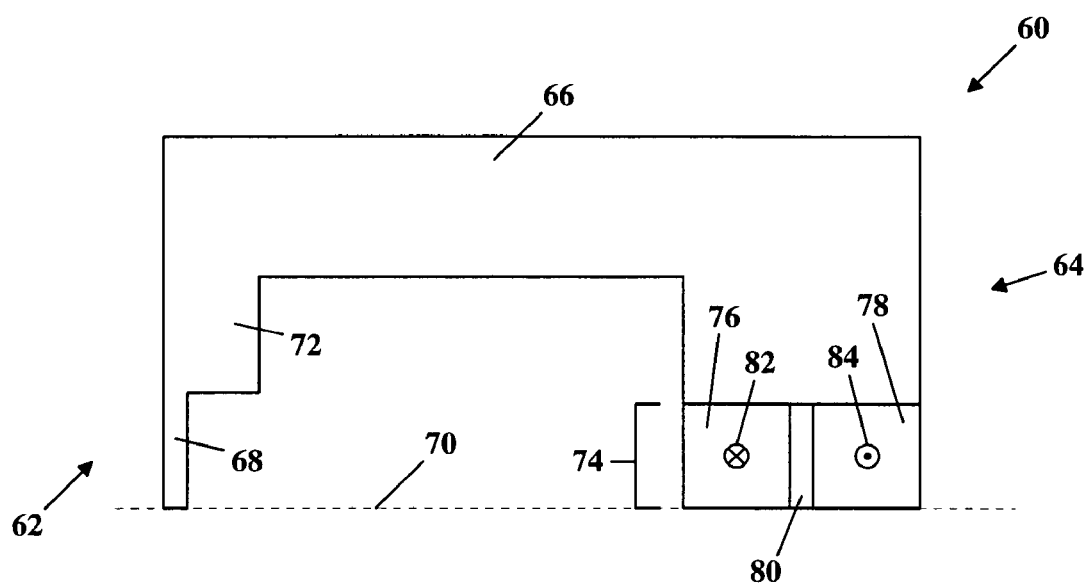
FIG. 1 is a cross-sectional view of a perpendicular writer in accord with a first embodiment of the present invention.

FIG. 1 is a cross-sectional view of perpendicular writer 60 in accord with a first embodiment of the present invention. Writer 60 has a yoke-return pole configuration and includes main pole 62, return pole 64, and back yoke 66. In the embodiment shown, main pole 62 further includes main pole tip 68 positioned adjacent main pole yoke 72, with main pole tip 68 extending to surface 70 of writer 60 and main pole yoke 72 preferably recessed a distance from surface 70. In other embodiments, main pole yoke 72 is omitted from main pole 62. Main pole 62 is separated from return pole 64 at surface 70 by a write gap and is connected to return pole 64 distal to surface 70 by back yoke 66. To write data to a magnetic medium, an electric current is caused to flow through a conductive coil (not shown) wrapped about back yoke 66 or main pole yoke 72, which in turn produces a magnetic field in main pole 62, return pole 64, and back yoke 66.

Portion 74 of return pole 64 is laminated to cause the magnetization of return pole 64 adjacent surface 70 to be oriented in a direction substantially parallel to surface 70. Preferably, the magnetization direction is less than a 4° departure from parallel, and more preferably, less than a 2° departure. Laminated portion 74 preferably extends from surface 70 of writer 60 toward back yoke 66, but not as far as back yoke 66. This configuration better ensures magnetic flux will travel along return pole 64 from back yoke 66 toward surface 70.

Laminated portion 74 is formed of magnetic layers 76 and 78 separated by non-magnetic layer 80. Magnetic layers 76 and 78 are each preferably formed of a magnetic material such as CoFe, CoNiFe, FeCoN, CoNiFeN, FeAlN, FeTaN, FeN, NiFe, NiFeCr, NiFeN, CoZr, CoZrNb, CoZrTa or other suitable material. Magnetic layers 76 and 78 are magnetically coupled to one another (either magnetostatically or antiferromagnetically) with magnetization 82 of magnetic layer 76 being substantially antiparallel to magnetization 84 of magnetic layer 78. Shape anisotropy is used to ensure that magnetizations 82 and 84 remain substantially parallel to surface 70 of writer 60, as opposed to substantially normal to surface 70. In particular, magnetic layers 76 and 78 each have a width (its dimension into the page of FIG. 3) substantially greater than its height (its dimension extending from surface 70 toward back yoke 66), which results in an easy axis of magnetic layers 76 and 78 aligned in the direction of the layer's width. Further, the coupling strength between magnetic layers 76 and 78 is preferably sufficiently strong to resist rotation of magnetizations 76 and 78 from substantially parallel to surface 70 during a write operation for a magnetic field up to 1000 Oe.

Nonmagnetic layer 80 may be formed of any nonmagnetic material that is mechanically and chemically compatible with the magnetic materials used for magnetic layers 76 and 78. Nonmagnetic layer 80 may be formed of either an electrically conducting or an electrically insulating material and may result in either magnetostatic or antiferromagnetic coupling between magnetic layers 76 and 78. Suitable materials for nonmagnetic layer 80 include copper, ruthenium, gold, tantalum, aluminum, rhodium, chromium, copper-silver alloys, nitride, carbide, and various oxides, including aluminum oxide and silicon dioxide. The strength of the coupling between magnetic layers 76 and 78 can be controlled by a thickness of nonmagnetic layer 80.

Thus, laminated portion 74 of return pole 64 reduces the concentration of magnetic flux along the edges of return pole 64, and correspondingly minimizes any side track erasure caused by return pole 64. Laminated portion 74 of return pole 64 further reduces eddy currents in return pole 64, thus minimizing the eddy current skin effect at high recording frequencies. In sum, laminated portion 74 will cause the magnetic flux flow in return pole 64 to become more dispersed and uniform in the vicinity of surface 70.

Although shown in FIG. 1 as having only two magnetic layers separated by a single nonmagnetic layer, a perpendicular writer in accord with the present invention may incorporate any number of laminations in the return pole of the writer. However, it is preferred that the number of magnetic layers be an even number. The laminations may extend to any location between the back yoke of the writer and a surface opposite the back yoke.

Figure 2:
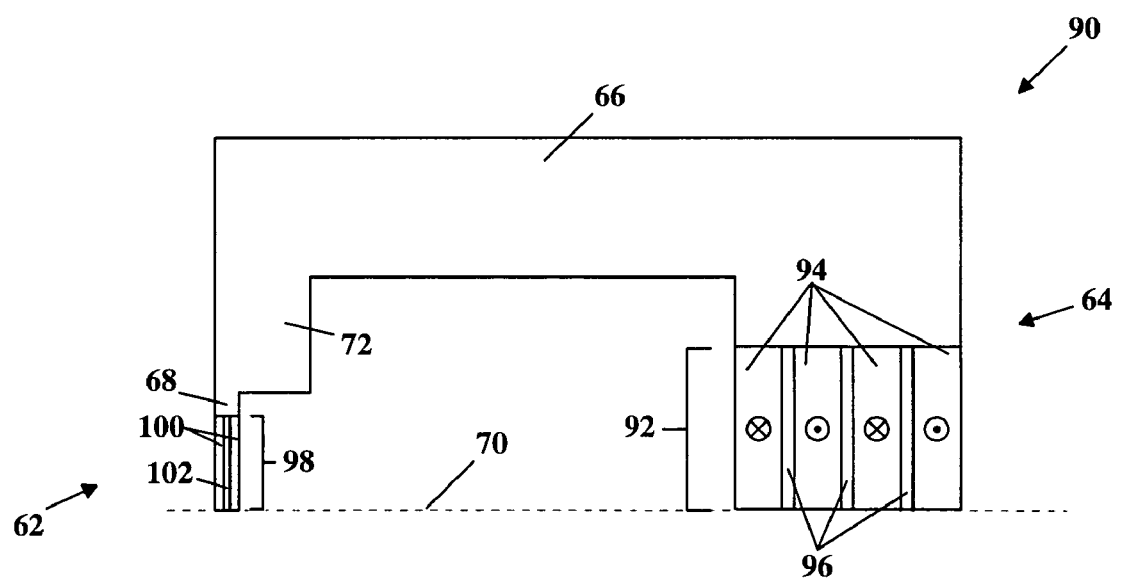
FIG. 2 is a cross-sectional view of a perpendicular writer in accord with a second embodiment of the present invention.

FIG. 2 introduces a more generalized embodiment of the present invention. More specifically, FIG. 2 is a cross-sectional view of perpendicular writer 90 in accord with a second embodiment of the present invention. For ease of reference, elements common to both perpendicular writers 60 and 90 are numbered identically. Writer 90 is substantially similar to writer 60 of FIG. 1, but substitutes laminated portion 92 for laminated portion 74.

Laminated portion 92 of return pole 64 is formed of n magnetic layers 94 having (n−1) nonmagnetic layers 96 interspersed therebetween. Perpendicular writer 60 of FIG. 2 includes four magnetic layers 94 and three nonmagnetic layers 96. Variable n may be any positive integer, but preferably is an even integer. These laminations cause the magnetization of return pole 64 adjacent surface 70 to be oriented in a direction substantially parallel (i.e., less than about 4° departure from parallel) to surface 70. Preferably, this orientation of the magnetization will be less than 4° from parallel with surface, and more preferably, less than 2° from parallel. Laminated portion 92 preferably extends from surface 70 of writer 60 toward back yoke 66, but not as far as back yoke 66. This configuration better ensures magnetic flux will travel along return pole 64 from back yoke 66 toward surface 70.

Magnetic layers 94 are magnetically coupled to one another (either magnetostatically or antiferromagnetically) with adjacent magnetic layers 94 having their magnetizations oriented substantially antiparallel to each other. Shape anisotropy is used to ensure that the magnetizations of magnetic layers 94 remain substantially parallel to surface 70 of writer 90, as opposed to substantially normal to surface 70. In particular, magnetic layers 94 each have a width (its dimension into the page of FIG. 2) substantially greater than its height (its dimension extending from surface 70 toward back yoke 66), which results in an easy axis of magnetic layers 94 falling in the direction of the layer's width. Further, the coupling strength between magnetic layers 94 is preferably sufficiently strong to resist rotation of the magnetization of magnetic layers 94 from substantially parallel to surface 70 during a write operation for a magnetic field up to 1000 Oe.

Nonmagnetic layers 96 may be formed of any nonmagnetic material that is mechanically and chemically compatible with the magnetic materials used for magnetic layers 94. Nonmagnetic layers 96 may be formed of either an electrically conducting or an electrically insulating material and may result in either magnetostatic coupling, antiferromagnetic coupling, or a combination thereof between magnetic layers 94. Suitable materials for nonmagnetic layers 96 include copper, ruthenium, gold, tantalum, aluminum, rhodium, chromium, copper-silver alloys, nitride, carbide, and various oxides, including aluminum oxide and silicon dioxide. The strength of the coupling between magnetic layers 94 can be controlled by thicknesses of nonmagnetic layers 96.

Performance of perpendicular writer 90 is further improved by laminating portion 98 of main pole tip 68. Laminated portion 98 includes m magnetic layers 100 and (m−1) nonmagnetic layers 102 interspersed therebetween. Perpendicular writer 90 illustrated in FIG. 2 includes two magnetic layers 100 separated by a single nonmagnetic layer 102. Although variable m may be any positive integer, variable m is preferably an even integer.

Figure 3:
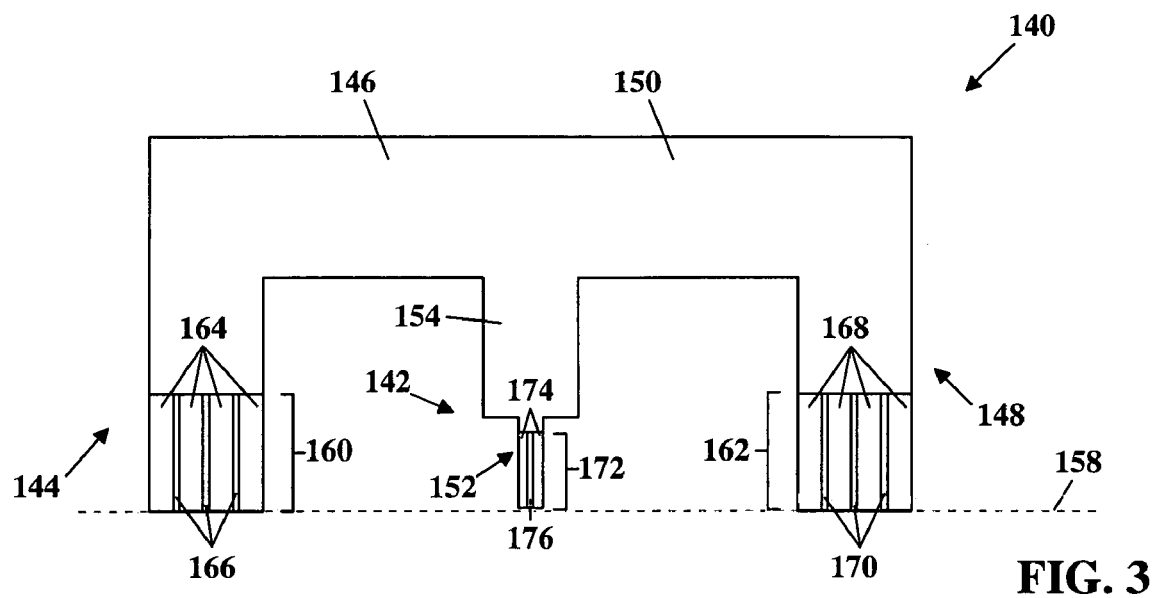
FIG. 3 is a cross-sectional view of a perpendicular writer in accord with a third embodiment of the present invention.

The present invention also applies to other configurations of perpendicular writers, such as a cusp-pole configuration as illustrated in FIG. 3. Specifically, FIG. 3 is a cross-sectional view of perpendicular writer 140 in accord with a third embodiment of the present invention which includes main pole 142, first return pole 144, first back yoke 146, second return pole 148, and second back yoke 150. Main pole 142 further includes main pole tip 152 adjacent main pole yoke 154 with main pole tip 152 preferably extending from main pole yoke 154 toward surface 158 of writer 140 and main pole yoke 154 being recessed a distance from surface 158. Main pole 142 is separated from first and second return poles 144 and 148 at surface 158 by first and second write gaps, respectively, and is connected to first and second return poles 144 and 148 distal to surface 158 by first and second back yokes 146 and 150, respectively. To write data to a magnetic medium, an electric current is caused to flow through a conductive coil (not shown) wrapped about main pole 142, which in turn produces a magnetic field in main pole 142, first and second return poles 144 and 148, and first and second back yokes 146 and 150.

Portions 160 and 162 of respective first and second return poles 144 and 148 respectively are laminated to cause the magnetizations of first and second return poles 144 and 148 adjacent surface 158 to be oriented in a direction substantially parallel to surface 158. Preferably, the magnetization direction is less than a 4° departure from parallel, and more preferably, less than a 2° departure. Laminated portions 160 and 162 preferably extend from surface 158 of writer 140 toward first and second back yokes 146 and 150, but not as far as first and second back yokes 146 and 150.

Laminated portion 160 of first return pole 144 is formed of n magnetic layers 164 separated by (n−1) non-magnetic layers 166 interspersed therebetween. Likewise, laminated portion 162 of second return pole 148 is formed of m magnetic layers 168 separated by (m−1) nonmagnetic layers 170 interspersed therebetween. In the embodiment illustrated in FIG. 5, n and m both equal four; however, in other embodiments, these variables may differ from one another. Preferably, variables n and m are both even numbers. Magnetic layers 164 are each preferably formed of a magnetic material such as CoFe, CoNiFe, FeCoN, CoNiFeN, FeAlN, FeTaN, FeN, NiFe, NiFeCr, NiFeN, CoZr, CoZrNb, CoZrTa or other suitable material. Magnetic layers 164 are magnetically coupled to one another (either magnetostatically or antiferromagnetically) with adjacent magnetic layers 164 having their magnetizations oriented substantially antiparallel to each other. Shape anisotropy is used to ensure that the magnetizations of magnetic layers 164 remain substantially parallel to surface 158 of writer 140, as opposed to substantially normal to surface 158. In particular, magnetic layers 164 each have a width (its dimension into the page of FIG. 3) substantially greater than its height (its dimension extending from surface 158 toward first back yoke 146), which results in an easy axis of each magnetic layer 164 falling in the direction of the layer's width. Further, the coupling strength between magnetic layers 164 is preferably sufficiently strong to resist rotation of the magnetization of magnetic layers 164 from substantially parallel to surface during a write operation for a magnetic field up to 1000 Oe.

Nonmagnetic layers 166 may be formed of any nonmagnetic material that is mechanically and chemically compatible with the magnetic materials used for magnetic layers 164. Nonmagnetic layers 166 may be formed of either an electrically conducting or an electrically insulating material and may result in magnetostatic coupling, antiferromagnetic exchange coupling, or a combination thereof between magnetic layers 164. Suitable materials for nonmagnetic layers 166 include copper, ruthenium, gold, tantalum, aluminum, rhodium, chromium, copper-silver alloys, nitride, carbide, and various oxides, including aluminum oxide and silicon dioxide. The strength of the coupling between magnetic layers 164 can be controlled by thicknesses of nonmagnetic layers 166. Laminated portion 162 of second return pole 148 is substantially similar to laminated portion 160 of first return pole 144, and thus will not be discussed further here.

Like with perpendicular writer 90 of FIG. 2, performance of perpendicular writer 140 is further improved by laminating portion 172 of main pole tip 152. Laminated portion 172 includes p magnetic layers 174 and (p−1) nonmagnetic layers 176 interspersed therebetween. Preferably, variable p is a positive integer. Perpendicular writer 140 illustrated in FIG. 3 includes two magnetic layers 100 separated by a single nonmagnetic layer 102.

Figure 4:
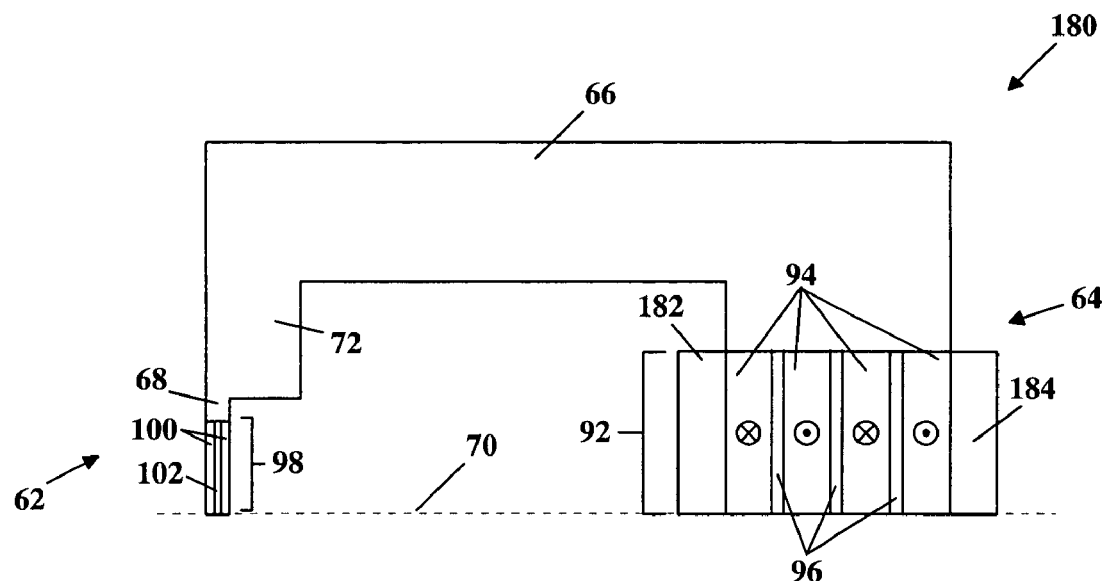
FIG. 4 is a cross-sectional view of a perpendicular writer for illustrating a fourth, fifth, and sixth embodiment of the present invention.

FIG. 4 is a cross-sectional view of perpendicular writer 180 in accord with the present invention. Perpendicular writer 180 includes the addition of layers 182 and 184 on opposing sides of return pole 64. Perpendicular writer 180 is essentially identical to perpendicular writer 90 of FIG. 2, with the addition of layers 182 and 184 to the edges of laminated portion 92 of return pole 64. Accordingly, elements common to both perpendicular writers 90 and 180 are numbered identically.

In accord with a fourth embodiment of the present invention, layers 182 and 184 are each formed of a low magnetic moment material. In this embodiment, layers 182 and 184 will reduce a magnetization gradient (i.e., magnetic charge) along the edges of return pole 64 adjacent surface 70. This in turn helps to further suppress any side track erasure that may otherwise be caused by return pole 64.

In accord with a fifth embodiment, layers 182 and 184 are formed of an antiferromagnetic material such as IrMn, PtMn, NiMn, NiO, FeMn, and alloys thereof, which alloys may further include materials such as Cr, B, or V. In this embodiment, layers 182 and 184 have their magnetization set in a direction substantially parallel to surface 70. As such, they exert a pinning forcing on magnetic layers 94, further ensuring that the magnetizations of magnetic layers 94 remain substantially parallel to surface 70.

In a sixth embodiment, layers 182 and 184 are each formed of an antiferromagnetic material while return pole 64 is unlaminated. The antiferromagnetic material may include such as IrMn, PtMn, NiMn, NiO, FeMn, and alloys thereof, which alloys may further include materials such as Cr, B, or V. In this embodiment, layers 182 and 184 have their magnetization set in a direction substantially parallel to surface 70. As such, they exert a magnetic force on unlaminated return pole 64, which reduces the vertical magnetization component along the edges of return pole 64.

Figure 5:
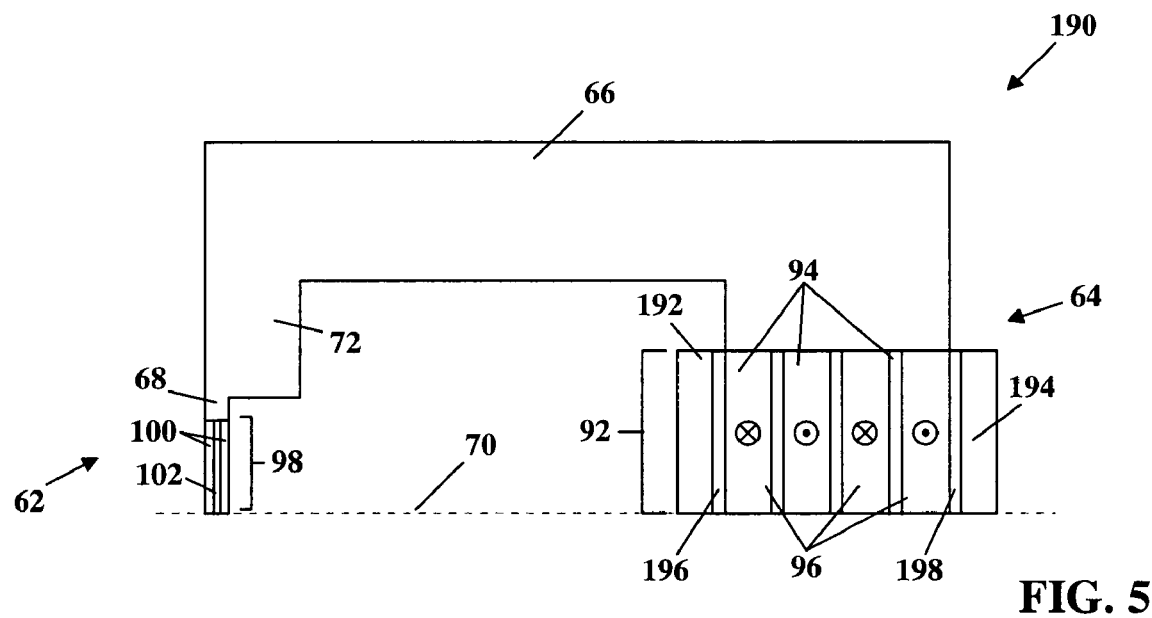
FIG. 5 is a cross-sectional view of a perpendicular writer for illustrating a seventh and eighth embodiment of the present invention.

FIG. 5 is a cross-sectional view of perpendicular writer 190 in accord with the present invention. Elements common to both perpendicular writers 90 and 180 are numbered identically. In accord with a seventh embodiment of the present invention, perpendicular writer 190 adds hard ferromagnetic layers 192 and 194 and thin spacer layers 196 and 198 to the edges of laminated portion 92 of return pole 64 of perpendicular writer 90 of FIG. 2. Hard ferromagnetic layers 192 and 194 may be formed of any hard ferromagnetic material (for instance, CoCrPt having a coercivity in a range of about 3000 Oe to about 5000 Oe). Hard ferromagnetic layers 192 and 194 are positioned on opposing sides of laminated portion 92 of return pole 64, while spacer layers 196 and 198 are positioned between a respective one of hard ferromagnetic layers 192 and 194 and return pole 64. Hard ferromagnetic layers 192 and 194 have their magnetizations set in a direction substantially parallel to surface 70. As such, they exert a magnetic force on laminated portion 92 of return pole 64, which further ensures that the magnetizations of magnetic layers 94 remain substantially parallel to surface 70.

Alternately, in an eighth embodiment, return pole 64 may be unlaminated. Here, hard ferromagnetic layers 192 and 194 again have their magnetization set in a direction substantially parallel to surface 70. As such, they exert a magnetic force on unlaminated return pole 64, which reduces the vertical magnetization component along the edges of return pole 64.

Figure 6:
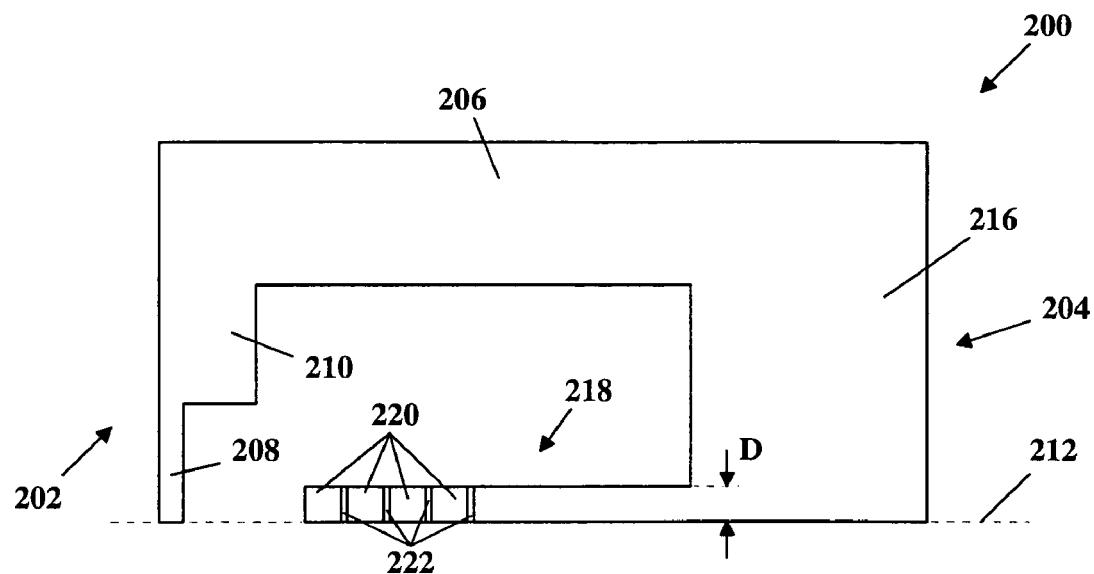
FIG. 6 is a cross-sectional view of a perpendicular writer in accord with a ninth embodiment of the present invention.

FIG. 6 is a cross-sectional view of perpendicular writer 200 in accord with a ninth embodiment of the present invention. Writer 200 has a yoke-return pole configuration and includes main pole 202, return pole 204, and back yoke 206. Main pole 202 further includes main pole tip 208 positioned adjacent main pole yoke 210, with main pole tip 208 extending to surface 212 of writer 200 and main pole yoke 210 preferably recessed a distance from surface 212. Alternate embodiments omit main pole yoke 210. Main pole 202 is separated from return pole 204 at surface 212 by a write gap and is connected to return pole 204 distal to surface 212 by back yoke 206. To write data to a magnetic medium, an electric current is caused to flow through a conductive coil (not shown) wrapped about back yoke 206 or main pole yoke 210, which in turn produces a magnetic field in main pole 202, return pole 204, and back yoke 206.

Return pole 204 further includes return pole body 216 and return pole extension 218. Return pole extension 218 is a thin layer extending along surface 212 from return pole body 216. Preferably, return pole extension 218 has a thickness D (measured in a direction substantially normal to surface 212) less than about 0.3 micrometers, and more preferably, less than about 0.2 micrometers. The thinness of return pole extension 218 creates a shape anisotropy that encourages the magnetization of return pole extension 218 to orient in a direction substantially parallel to surface 212. Preferably, the magnetization direction is less than a 4° departure from parallel and more preferable, is less than a 2° departure. Thin return pole extension 218 thus causes a drastic reduction in the vertical magnetization component along the edges of return pole 204, and thus helps to suppress any side track erasure that otherwise might be caused by conventional return poles.

To further improve the performance of perpendicular writer 200, at least a portion of return pole extension 218 nearest the write gap may be laminated with alternating layers of magnetic and nonmagnetic layers. As shown in FIG. 6, return pole extension 218 includes magnetic layers 220 and nonmagnetic layers 222 interspersed therebetween. Magnetic layers 220 and nonmagnetic layers 222 have properties as described above with reference to the laminated layers in earlier figures.

Figure 7:
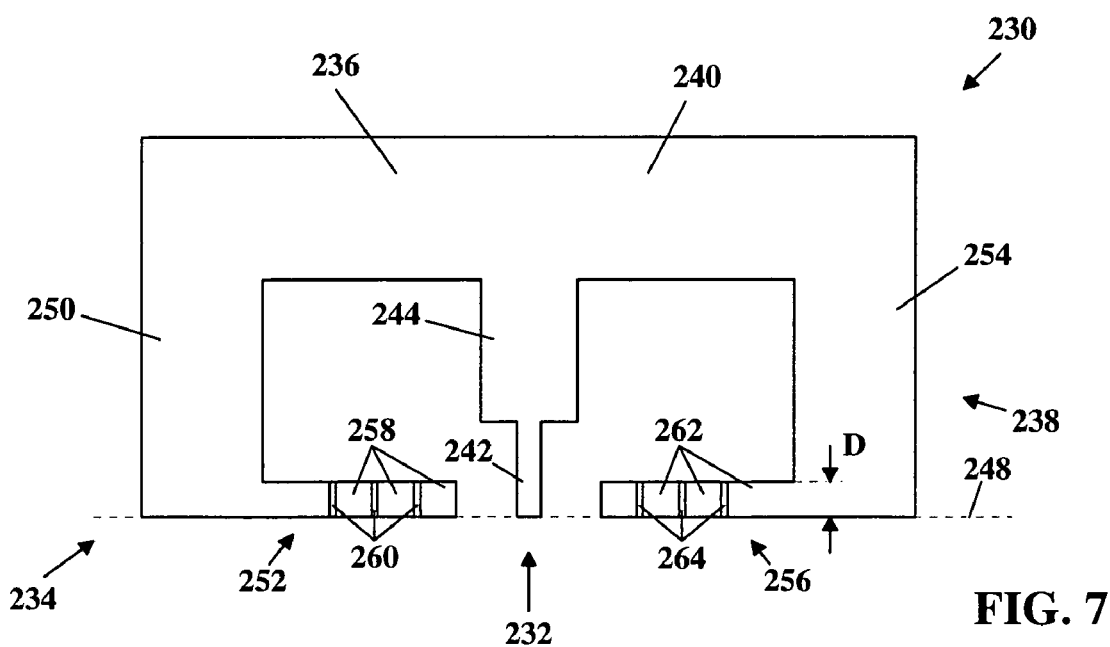
FIG. 7 is a cross-sectional view of a perpendicular writer in accord with a tenth embodiment of the present invention.

FIG. 7 is a cross-sectional view of perpendicular writer 230 in accord with a tenth embodiment of the present invention. Writer 230 has a cusp-pole configuration and includes main pole 232, first return pole 234, first back yoke 236, second return pole 238, and second back yoke 240. Main pole 232 further includes main pole tip 242 positioned between first and second main pole yokes 244 and 246, with main pole tip 242 extending to surface 248 of writer 230 and first and second main pole yokes 244 and 246 preferably being recessed a distance from surface 248. Alternate embodiments omit first and second main pole yokes 244 and 246. Main pole 232 is separated from first and second return poles 234 and 238 at surface 248 by first and second write gaps, respectively, and is connected to first and second return poles 234 and 238 distal to surface 248 by first and second back yokes 236 and 240, respectively. To write data to a magnetic medium, an electric current is caused to flow through a conductive coil (not shown) wrapped about main pole 232, which in turn produces a magnetic field in main pole 232, first and second return poles 234 and 238, and first and second back yokes 236 and 240.

First return pole 234 further includes first return pole body 250 and first return pole extension 252. Likewise, second return pole 238 includes second return pole body 254 and second return pole extension 256. First and second return pole extensions 252 and 256 are each a thin layer extending along surface 248 from a respective one of first and second return pole bodies 250 and 254. Preferably, each of first and second return pole extensions 252 and 256 has a thickness D (measured in a direction substantially normal to surface 248) less than about 0.3 micrometers, and more preferably, less than about 0.2 micrometers. The thinness of first and second return pole extensions 252 and 256 create a shape anisotropy that encourages the magnetization thereof to orient in a direction substantially parallel to surface 248. Preferably, the magnetization direction is less than a 4° departure from parallel, and more preferably, is less than a 2° departure. First and second thin return pole extensions 252 and 256 thus causes a drastic reduction in the vertical magnetization component along the edges of first and second return poles 234 and 238, and thus helps to suppress any side track erasure that otherwise might be caused by conventional return poles.

To further improve the performance of perpendicular writer 230, at least a portion of each of first and second return pole extensions 252 and 256 may be laminated with alternating layers of magnetic and nonmagnetic layers. As shown in FIG. 7, first return pole extension 252 includes magnetic layers 258 and nonmagnetic layers 260 interspersed therebetween, while second return pole extension 256 includes magnetic layers 262 and nonmagnetic layers 264 interspersed therebetween. Magnetic layers 258 and 262 and nonmagnetic layers 260 and 264 have properties as described above with reference to the laminated layers in earlier figures.

Figure 8:
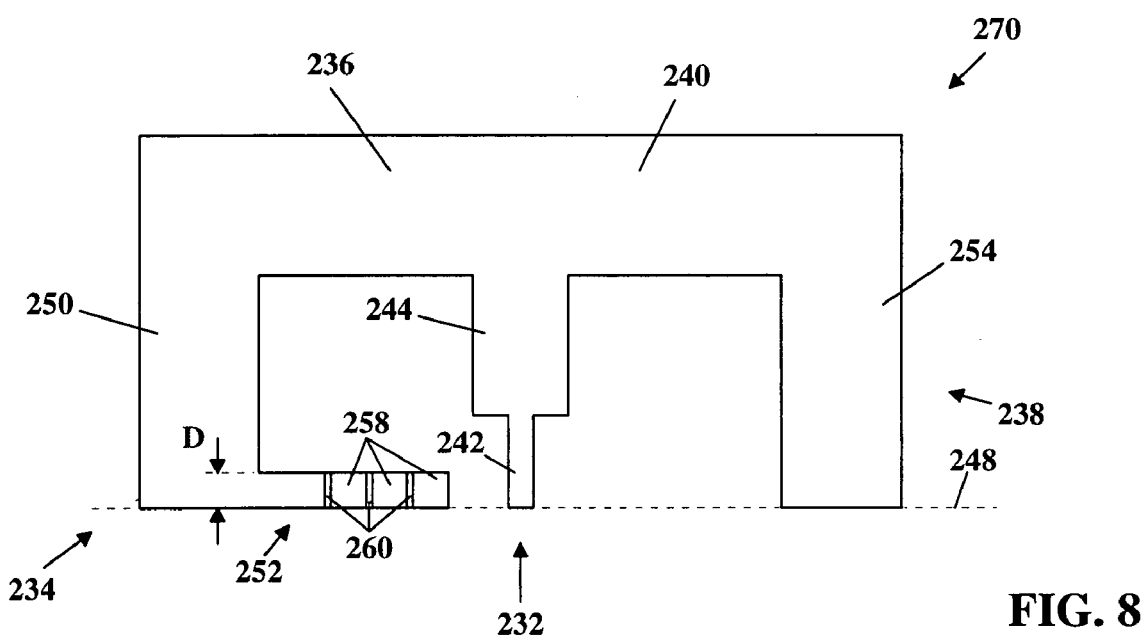
FIG. 8 is a cross-sectional view of a perpendicular writer in accord with an eleventh embodiment of the present invention.

FIG. 8 is a cross-sectional view of perpendicular writer 270 in accord with an eleventh embodiment of the present invention. Writer 270 is substantially similar to writer 230 of FIG. 7 except that second return pole of 238 of writer 270 includes only second return pole body 254 and not second return pole extension 256. Like previous embodiments, second return pole body 254 may be laminated adjacent surface 248.

In sum, the present invention recognizes that magnetic flux in a return pole of a conventional perpendicular writer is concentrated along the edges of the return pole, and that this heavy concentration may cause undesired side track erasure by the return pole. To overcome this problem with conventional perpendicular writers, the present invention introduces a perpendicular writer having its return pole configured such that, during a write operation, the magnetization of the return pole adjacent a surface opposite a back via is substantially parallel to the adjacent surface of the writer. This reorientation of the magnetization of the return pole suppresses any side writing by the return pole.

In accord with the present invention, the magnetization of the return pole may be oriented in any of a number of ways, including the lamination of a portion of the return pole, the addition of materials adjacent the return pole to influence the magnetization of the return pole, and/or the addition of a thin return pole extension.

While many of the layers of the perpendicular writers illustrated in FIGS. 1-8 are planar layers, it is contemplated that they may follow other contours. Additionally, none of the figures is rendered to scale.

Although the present invention has been described with reference to preferred embodiments, workers skilled in the art will recognize that changes may be made in form and detail without departing from the spirit and scope of the invention.

The invention claimed is:

1. A perpendicular writer comprising:
a surface;
a main pole proximate the surface;
a return pole proximate the surface and spaced away from the main pole at the surface, wherein the return pole includes a laminated portion adjacent the surface comprising n magnetic layers and (n−1) nonmagnetic layers interspersed between the magnetic layers, wherein each of the magnetic and nonmagnetic layers extends from the surface toward a back yoke, and wherein the back yoke connects the main pole and the return pole distal the surface, the return pole being configured such that a magnetization of a portion adjacent the surface is held substantially parallel to the surface during a write operation; and
a first layer positioned on a first outermost magnetic layer of the laminated portion of the return pole; and a second layer positioned on a second outermost magnetic layer of the laminated portion of the return pole, wherein the first layer and second layer comprise a low moment magnetic material, an antiferromagnetic material, or a bilayer comprising a hard ferromagnetic material and a nonmagnetic material.

2. The perpendicular writer of claim 1 wherein the magnetic layers are coupled to each other with a coupling strength in excess of about 1000 Oe.

3. The perpendicular writer of claim 2 wherein the magnetic layers are antiferromagnetically coupled to each other.

4. The perpendicular writer of claim 2 wherein the magnetic layers are magnetostatically coupled to each other.

5. The perpendicular writer of claim 1 wherein the first and second layers comprise a low magnetic moment material positioned on a respective one of first and second outermost magnetic layers of the laminated portion of the return pole.

6. The perpendicular writer of claim 1 wherein the first layer comprises an antiferromagnetic material positioned on a first outermost magnetic layer of the laminated portion of the return pole and the second layer comprises an antiferromagnetic material positioned on a second outermost magnetic layer of the laminated portion of the return pole.

7. The perpendicular writer of claim 1 wherein the first layer comprises a first bilayer of a hard ferromagnetic material and a nonmagnetic material positioned on a first outermost magnetic layer of the laminated portion of the return pole and the second layer comprises a second bilayer of a hard ferromagnetic material and a nonmagnetic material positioned on a second outermost magnetic layer of the laminated portion of the return pole, wherein the nonmagnetic material of the first bilayer is positioned between the hard ferromagnetic layer of the first bilayer and the first outermost magnetic layer and the nonmagnetic material of the second bilayer is positioned between the hard ferromagnetic layer of the second bilayer and the second outermost magnetic layer.

8. The perpendicular writer of claim 1 wherein the return pole comprises a return pole body extending from the surface toward the back yoke and a return pole extension extending from the return pole body adjacent the surface toward the main pole, and wherein a thickness of the return pole extension measured in a direction substantially normal to the surface is less than about 0.3 micrometers.

9. The perpendicular writer of claim 8 wherein the thickness of the return pole extension is less than about 0.2 micrometers.

10. The perpendicular writer of claim 8 wherein the return pole extension comprises m magnetic layers and (m−1) nonmagnetic layers interspersed between the magnetic layers.

11. A perpendicular writer comprising:
a surface;
a main pole proximate the surface;
a return pole proximate the surface and spaced away from the main pole at the surface, the return pole having a laminated portion comprising at least one nonmagnetic layer and a plurality of magnetic layers separated from each other by the at least one nonmagnetic layer, wherein the magnetic layers are each magnetically coupled to one each other with a coupling strength in excess of about 1000 Oe, wherein each of the magnetic and nonmagnetic layers extends from the surface toward a back yoke, wherein the back yoke connects the main pole and the return pole distal the surface; and
a first layer positioned on a first outermost magnetic layer of the laminated portion of the return pole; and a second layer positioned on a second outermost magnetic layer of the laminated portion of the return pole, wherein the first layer and second layer comprise a low moment magnetic material, an antiferromagnetic material, or a bilayer comprising a hard ferromagnetic material and a nonmagnetic material.

12. The perpendicular writer of claim 11 wherein the magnetic layers are antiferromagnetically coupled to each other.

13. The perpendicular writer of claim 11 wherein the magnetic layers are magnetostatically coupled to each other.

14. The perpendicular writer of claim 11 wherein the first layer comprises a low magnetic moment material positioned on a first outermost magnetic layer of the laminated portion of the return pole and the second layer comprises a low magnetic moment material positioned on a second outermost magnetic layer of the laminated portion of the return pole.

15. The perpendicular writer of claim 11 wherein the first layer comprises an antiferromagnetic material positioned on a first outermost magnetic layer of the laminated portion of the return pole and the second layer comprises an antiferromagnetic material positioned on a second outermost magnetic layer of the laminated portion of the return pole.

16. The perpendicular writer of claim 11 wherein the first layer comprises a first bilayer of a hard ferromagnetic material and a nonmagnetic material positioned on a first outermost magnetic layer of the laminated portion of the return pole and the second bilayer comprises a hard ferromagnetic material and a nonmagnetic material positioned on a second outermost magnetic layer of the laminated portion of the return pole, wherein the nonmagnetic material of the first bilayer is positioned between the hard ferromagnetic layer of the first bilayer and the first outermost magnetic layer and the nonmagnetic material of the second bilayer is positioned between the hard ferromagnetic layer of the second bilayer and the second outermost magnetic layer.

17. A perpendicular writer comprising:
a surface;
a main pole proximate the surface;
a return pole proximate the surface and spaced away from the main pole at the surface;
a back yoke connecting the main pole and the return pole distal the surface; and a first and a second layer positioned on opposing sides of the return pole adjacent the surface, wherein the return pole and first and second layers are configured such that a magnetization of a portion of the return pole adjacent the surface is held substantially parallel to the surface during a write operation and wherein the first and second layers comprise a low magnetic moment magnetic material, an antiferromagnetic material, or a bilayer comprising a hard ferromagnetic material and a nonmagnetic material.

18. The perpendicular writer of claim 17 wherein the first and second layers are formed of an antiferromagnetic material.

19. A perpendicular writer comprising:
a surface;
a main pole proximate the surface;
a return pole proximate the surface and spaced away from the main pole at the surface, the return pole being configured such that a magnetization of a portion adjacent the surface is held substantially parallel to the surface during a write operation; and
a back yoke connecting the main pole and the return pole distal the surface;
wherein the return pole comprises a return pole body extending from the surface toward the back yoke and a return pole extension extending from the return pole body adjacent the surface toward the main pole, wherein a thickness of the return pole extension measured in a direction substantially normal to the surface is less than about 0.3 micrometers; and wherein the return pole extension comprises m magnetic layers and (m−1) nonmagnetic layers interspersed between the magnetic layers.

20. The perpendicular writer of claim 19 wherein the thickness of the return pole extension is less than about 0.2 micrometers.

* * * * *